March 8, 1927.

J. F. KEY

VALVE

Original Filed Oct. 2, 1922

1,620,108

Inventor

JAMES F. KEY.

By Lyon & Lyon

Attorneys

Patented Mar. 8, 1927.

1,620,108

UNITED STATES PATENT OFFICE.

JAMES FRANCIS KEY, OF SIERRA MADRE, CALIFORNIA, ASSIGNOR TO FIRST TRUST AND SAVINGS BANK OF PASADENA, TRUSTEE.

VALVE.

Original application filed October 2, 1922, Serial No. 591,778. Divided and this application filed October 17, 1924. Serial No. 744,149.

This application is a division of my application Serial No. 591,778, filed October 2, 1922.

This invention relates to valves, and while the invention may be applied to valves used for various purposes, it is especially useful when used in connection with valves such as are used on air hose for filling automobile tires with compressed air. These valves are carried on the end of a hose and after disconnecting them from the inflating nipple of the tire they are usually permitted to fall, or are thrown down upon the ground or upon a cement floor, as the case may be. The valve is usually operated by a lever, and when subjected to such rough usage the levers are frequently broken; such breakage tends to occur usually at the point of connection of the lever with the valve body. The general object of this invention is to provide simple means for operating such a valve, which is so constructed as to prevent injury to it or to its connection with the valve body if the valve is thrown around carelessly, as suggested above; more particularly, one of the objects of my invention is to provide a valve and lever of such a construction as will prevent lateral movement of the lever and thereby prevent breaking off the lugs by means of which the lever is connected to the valve body.

Further objects of the invention will appear hereinafter.

The invention consists in the novel parts and combination of parts to be described hereinafter, all of which contribute to produce a substantially indestructible valve.

A preferred embodiment of this invention is described in the following specification, while the broad scope of the invention is pointed out in the appended claims.

Figure 1:
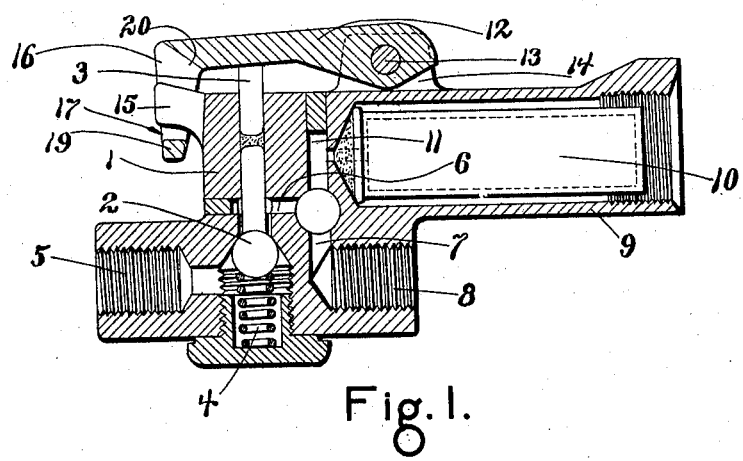
Fig. 1 is a vertical section through a valve embodying my invention.
Figure 2:
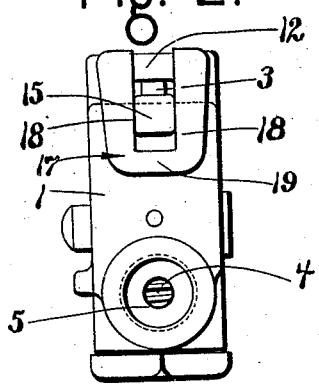
Fig. 2 is an end elevation of the valve shown in Fig. 1 and showing the same as viewed from the left end.
Figure 3:
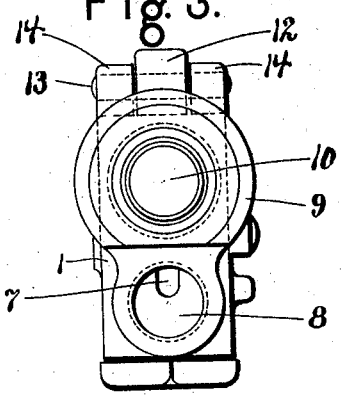
Fig. 3 is an end elevation showing the other end of the valve.
Figure 4:
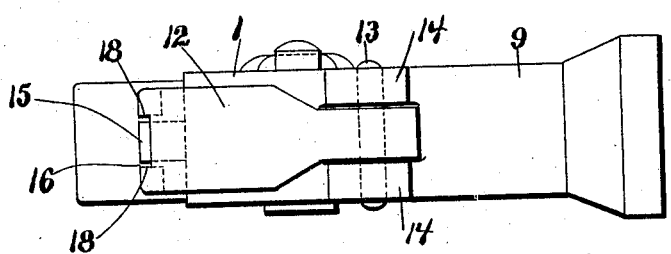
Fig. 4 is a plan of the valve.

My invention is capable of attachment to a valve of any construction which can be operated by a lever. In the present instance I have described my invention as applied to a valve of the construction illustrated in the drawing and in which 1 represents a valve body provided with a check valve 2 having a stem 3 projecting from the valve body and normally held on its seat by a light spring 4.

By shoving in on the stem 3 the valve 2 can be held off its seat, and when this occurs compressed aid can flow from the inlet opening 5 through ports 6 and 7 so as to pass through the outlet opening 8 which is connected to a small hose which connects with the inflating nipple of the tire.

The inlet opening 5 is provided with means such as screw threads for attaching the same to the air hose, and if desired similar threads may be provided at the outer opening 8 for connecting it with the short hose connection which connects to the inflating nipple.

The valve illustrated is also provided with a barrel 9 within which there is mounted a guage 10 which is forced outwardly by the air pressure when the valve is open; for this purpose air is admitted to the inner end of the gauge 10 through a suitable port 11.

In applying my invention to such a valve, I provide means such as the lever 12 for engaging the stem 3 to force the same inwardly and this lever is preferably connected by a suitable pivot means to the valve body. This lever is a simple lever and is devoid of any additional weight. In the present instance this connection involves the use of a pin 13 which is mounted between two lugs 14 which project from the side of the barrel 9. The lever fits into the space between these lugs.

I provide means for engaging and guiding the lever 12 at a point removed from the pivot means. The pivot pin 13 and this guiding means operates to prevent lateral movement of the lever; at the same time I prefer to construct this guiding means so that it limits the movement of the lever on its pivot. In order to accomplish this I provide the body 1 of the valve with a projection or lug 15 which is received in a guide socket 16 in a tail 17 which extends downwardly from the end of the lever 12, that is to say, it projects at right angles to the body of the lever and projects down along the side of the valve. The side faces 18 of the opening or slot 16 engage the side faces of this lug 15. The lug therefore operates to prevent lateral movement of the lever end, but it does not prevent up and down movement of the lever in controlling the valve. However, the end of the tail 17 is in the form of a cross-bar 19 which lies directly under the lug 15 and thus limits the outward movement of the lever. Above the lug 15 a sufficient gap 20 is provided (see Figure 1) which permits the downward movement of the lever which opens the valve.

With a valve body and lever constructed as described, it will be evident that any blow or force tending to move the lever laterally will be resisted by the lug 15 and this will prevent breaking the lever or the lugs 14; hence this valve may be thrown about carelessly without injury to the valve lever.

It is understood that the embodiment of the invention described herein is only one of the many embodiments this invention may take, and I do not wish to be limited in the practice of the invention, nor in the claims, to the particular embodiment set forth.

What I claim is:—

1. In a valve to be attached to the end of a hose, the combination of a body with means for attaching the same to a hose and to the inflating nipple of a tire, a lever having a pivot attaching the same to the body for opening the valve, said body having a projection for engaging and positively guiding the lever at a point removed from the pivot, operating to prevent lateral movement of the lever and relieve the pivot of lateral strain, said lever having means for engaging the projection to limit the swinging movement of the lever on its pivot.

2. In a valve to be attached to the end of a hose, the combination of a body with means for attaching the same to a hose and to the inflating nipple of a tire, a lever having a pivot for attaching the same to the body, a valve within the body having a stem engaged by the lever to enable the valve to be opened by pressing the lever, said body having a lug projecting therefrom, said lever having a socket receiving the said lug with the sides of the socket engaging the sides of the lug and operating to prevent lateral movement of the lever, thereby relieving the pivot of lateral strains, the end of the socket cooperating with the lug to limit the upward movement of the lever.

3. In a valve to be attached to the end of a hose, the combination of a body with means for attaching the same to the hose and to the inflating nipple of a tire, a lever having pivot-means for attaching the same to the body for opening the valve, and having an extension at its outer end projecting substantially at right angles to the body of the lever and projecting along the side of the body, said body having means for engaging and positively guiding the lever at a point on the last named side and removed from the pivot-means, operating to prevent lateral movement of the lever and thereby relieving the said pivot-means of lateral strains.

4. In a valve to be attached to the end of a hose, the combination of a body with means for attaching the same to the hose and to the inflating nipple of a tire, a lever having pivot-means for attaching the same to the body for opening the valve, and having an extension at its outer end projecting substantially at right angles to the body of the lever and projecting along the side of the body, and having a slot in said extension, said body having a lug projecting into the socket limiting the outward movement of the lever and cooperating with the socket to prevent lateral movement of the lever, and thereby relieving the pivot of lateral strains.

Signed at Los Angeles, Calif., this 9 day of October, 1924.

JAMES FRANCIS KEY.